(12) United States Patent
Goodman et al.

(10) Patent No.: US 9,519,944 B2
(45) Date of Patent: Dec. 13, 2016

(54) PIPELINE DEPENDENCY RESOLUTION

(71) Applicant: Apple Inc., Cupertino, CA (US)

(72) Inventors: Benjiman L. Goodman, Cedar Park, TX (US); Robert D. Kenney, Austin, TX (US); Gregory D. Roberts, Austin, TX (US)

(73) Assignee: Apple Inc., Cupertino, CA (US)

( * ) Notice: Subject to any disclaimer, the term of this patent is extended or adjusted under 35 U.S.C. 154(b) by 59 days.

(21) Appl. No.: 14/475,119

(22) Filed: Sep. 2, 2014

(65) Prior Publication Data

US 2016/0063662 A1    Mar. 3, 2016

(51) Int. Cl.
*G06T 1/20*    (2006.01)
*G06F 9/30*    (2006.01)

(52) U.S. Cl.
CPC .. *G06T 1/20* (2013.01); *G06F 9/30* (2013.01)

(58) Field of Classification Search
None
See application file for complete search history.

(56) References Cited

U.S. PATENT DOCUMENTS

| | | | | |
|---|---|---|---|---|
| 5,150,470 A * | 9/1992 | Hicks | .................... | G06F 9/3889 712/217 |
| 6,542,986 B1 * | 4/2003 | White | ................. | G06F 9/30152 712/217 |
| 7,290,121 B2 | 10/2007 | Kromer | | |
| 7,339,590 B1 * | 3/2008 | Moskal | ..................... | G06T 1/60 345/501 |
| 8,145,874 B2 * | 3/2012 | Venkumahanti | .......... | G06F 9/34 711/169 |
| 2008/0229068 A1 | 9/2008 | Bose et al. | | |
| 2009/0260013 A1 * | 10/2009 | Heil | ..................... | G06F 15/7825 718/103 |
| 2009/0287908 A1 * | 11/2009 | Rangan | ................... | G06F 8/441 712/206 |
| 2009/0327662 A1 | 12/2009 | Jiang et al. | | |
| 2012/0198214 A1 * | 8/2012 | Gadre | ................... | G06F 9/3004 712/225 |
| 2013/0151816 A1 * | 6/2013 | Indukuru | .............. | G06F 9/3857 712/206 |

(Continued)

*Primary Examiner* — Xiao Wu
*Assistant Examiner* — Yu Chen
(74) *Attorney, Agent, or Firm* — Meyertons, Hood, Kivlin, Kowert & Goetzel, P.C.

(57) ABSTRACT

Techniques are disclosed relating to dependency resolution among processor pipelines. In one embodiment, an apparatus includes a first special-purpose pipeline configured to execute, in parallel, a first type of graphics instruction for a group of graphics elements and a second special-purpose pipeline configured to execute, in parallel, a second type of graphics instruction for the group of graphics elements. In this embodiment, the apparatus is configured, in response to dispatch of an instruction of the second type, to mark a particular instruction of the first type with information indicative of the dispatched instruction. In this embodiment, the particular instruction and the dispatched instruction correspond to the same group of graphics elements. In this embodiment, the apparatus is configured to stall performance of the dispatched instruction until the first special-purpose pipeline has completed execution of the marked particular instruction. Exemplary instruction types include interpolate and sample instructions.

19 Claims, 6 Drawing Sheets

(56) References Cited

U.S. PATENT DOCUMENTS

| | | | |
|---|---|---|---|
| 2014/0258693 A1* | 9/2014 | Lindholm | G06F 9/38 |
| | | | 712/233 |
| 2014/0282566 A1* | 9/2014 | Lindholm | G06F 9/522 |
| | | | 718/102 |
| 2015/0220341 A1* | 8/2015 | Ohannessian, Jr. | G06F 9/30098 |
| | | | 712/217 |
| 2015/0277925 A1* | 10/2015 | Sleiman | G06F 9/3851 |
| | | | 712/215 |

* cited by examiner

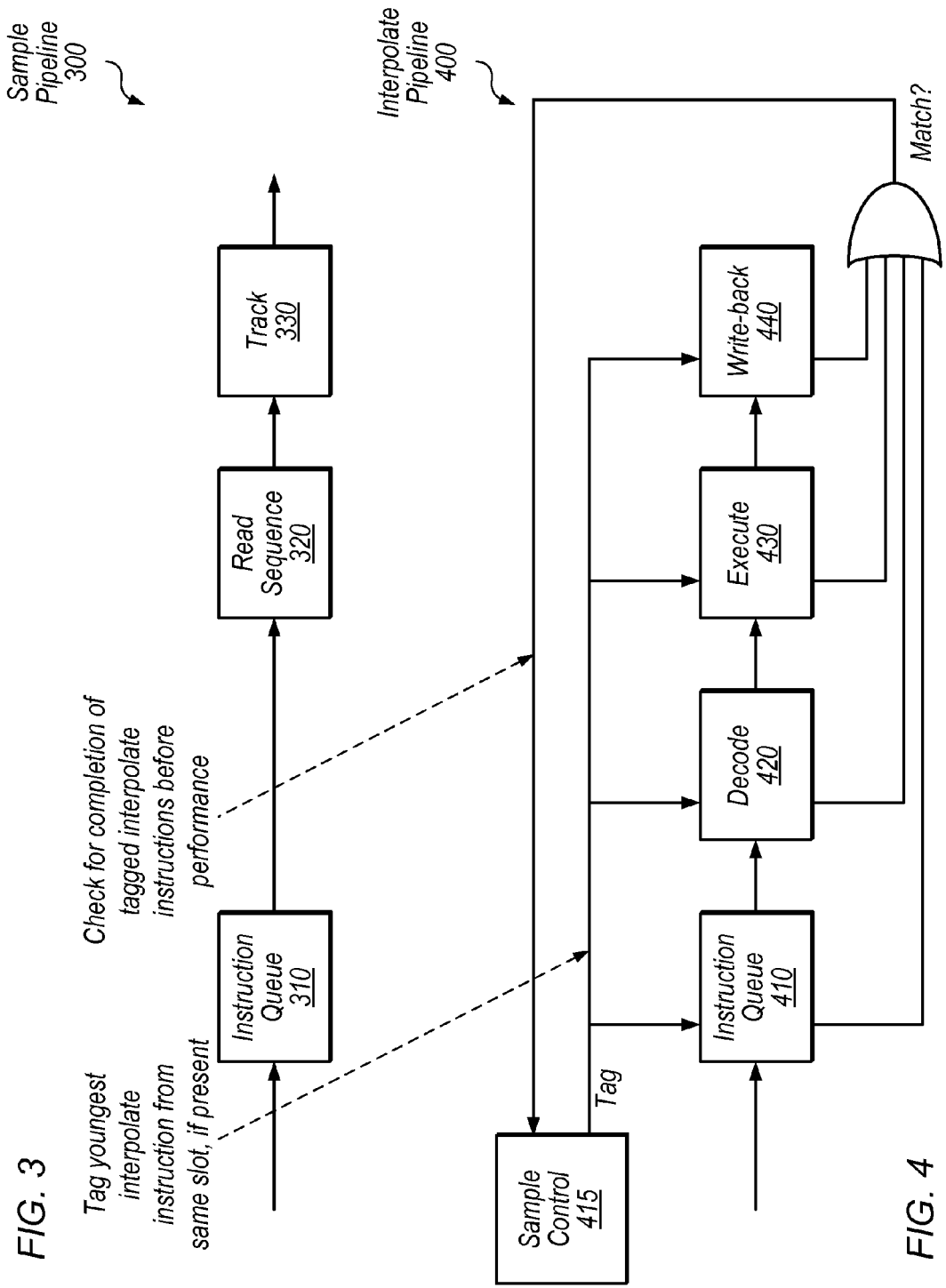

PIPELINE DEPENDENCY RESOLUTION

BACKGROUND

Technical Field

This disclosure relates generally to computer processing and more specifically to dependency resolution between different single-instruction-multiple-data (SIMD) pipelines.

Description of the Related Art

Graphics processing units (GPUs) typically operate on large amounts of graphics data in parallel using multiple execution pipelines or shaders. Graphics programs may include certain sequences of instructions that occur frequently. One common sequence involves an interpolation operation that generates texture coordinates followed by a sample operation to read the texture based on the coordinates. In this situation, the sample is dependent on the result of the interpolation. In other situations, interpolation results may not be destined for use in a sample operation. It may be desirable to use different pipelines to process different types of instructions, complicating dependency checking Complex circuitry to handle instruction dependencies (e.g., using register renaming techniques) may consume processor area and consume considerable power. This may be problematic in mobile graphics applications where a battery is a power source. Other techniques for handling dependencies, such as fence instructions, may reduce performance.

SUMMARY

Techniques are disclosed relating to dependency resolution among processor pipelines. In one embodiment, an apparatus includes a first special-purpose pipeline configured to execute, in parallel, a first type of graphics instruction for a group of graphics elements and a second special-purpose pipeline configured to execute, in parallel, a second type of graphics instruction for the group of graphics elements. In this embodiment, the apparatus is configured, in response to dispatch of an instruction of the second type, to mark a particular instruction of the first type with information indicative of the dispatched instruction. In this embodiment, the particular instruction and the dispatched instruction correspond to the same group of graphics elements. In this embodiment, the apparatus is configured to stall performance of the dispatched instruction until the first special-purpose pipeline has completed execution of the marked particular instruction. Exemplary instruction types include interpolate and sample instructions. In some embodiments, disclosed techniques may allow for improved performance and/or reduced complexity in resolving dependencies between instructions of the first and second types.

BRIEF DESCRIPTION OF THE DRAWINGS

FIG. 3 is a block diagram illustrating one embodiment of a sample pipeline.

FIG. 4 is a block diagram illustrating one embodiment of an interpolate pipeline.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112(f) for that unit/circuit/component.

DETAILED DESCRIPTION

Figure 1A:
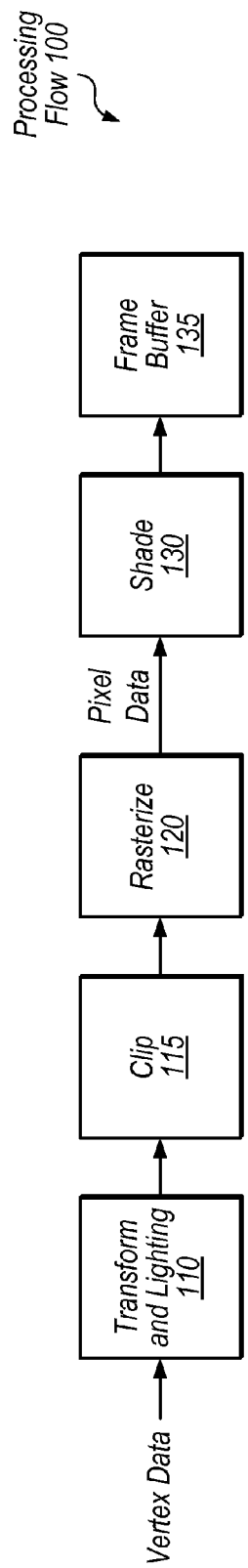
FIG. 1A is a block diagram illustrating an exemplary graphics processing flow.
Figure 1B:
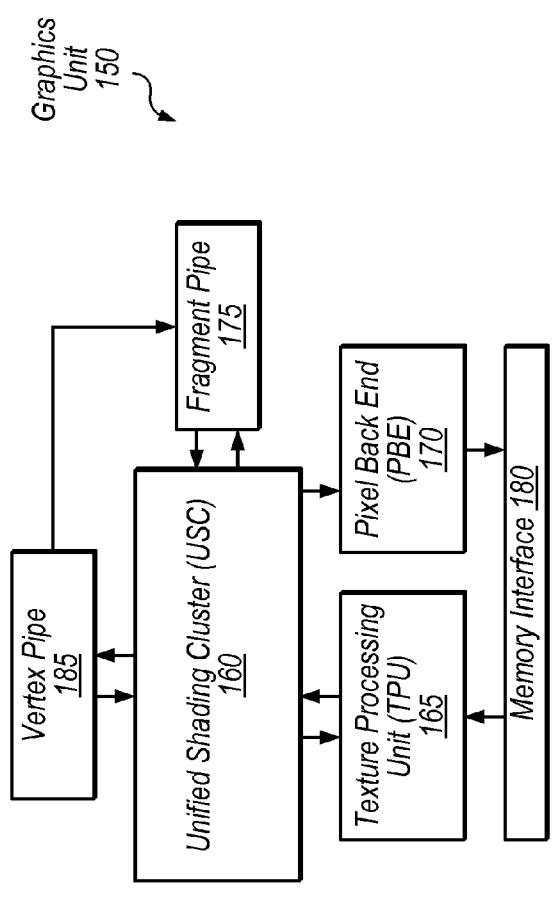
FIG. 1B is a block diagram illustrating one embodiment of a graphics unit.

This disclosure initially describes, with reference to FIGS. 1A-B, an overview of a graphics processing flow and an exemplary graphics unit. Embodiments of graphics pipelines and dependency resolution techniques are described in further detail with reference to FIGS. 2-6 and an exemplary device is described with reference to FIG. 7. The dependency resolution and forwarding techniques discussed herein may improve GPU shader performance, in some embodiments.

GPU Overview

Referring to FIG. 1A, a flow diagram illustrating an exemplary processing flow 100 for processing graphics data is shown. In one embodiment, transform and lighting step 110 may involve processing lighting information for vertices received from an application based on defined light source locations, reflectance, etc., assembling the vertices into polygons (e.g., triangles), and/or transforming the polygons to the correct size and orientation based on position in a three-dimensional space. Clip step 115 may involve discarding polygons or vertices that fall outside of a viewable area. Rasterize step 120 may involve defining fragments or pixels within each polygon and assigning initial color values for each fragment, e.g., based on texture coordinates of the vertices of the polygon. Shade step 130 may involve altering pixel components based on lighting, shadows, bump mapping, translucency, etc. Shaded pixels may be assembled in a frame buffer 135. Modern GPUs typically include programmable shaders that allow customization of shading and other processing steps by application developers. Thus, in various embodiments, the exemplary steps of FIG. 1A may be performed in various orders, performed in parallel, or omitted, and additional processing steps may be implemented.

Referring now to FIG. 1B, a simplified block diagram illustrating one embodiment of a graphics unit 150 is shown.

In the illustrated embodiment, graphics unit 150 includes unified shading cluster (USC) 160, vertex pipe 185, fragment pipe 175, texture processing unit (TPU) 165, pixel back end (PBE) 170, and memory interface 180. In one embodiment, graphics unit 150 may be configured to process both vertex and fragment data using USC 160, which may be configured to process graphics data in parallel using multiple execution pipelines or instances.

Vertex pipe 185, in the illustrated embodiment, may include various fixed-function hardware configured to process vertex data. Vertex pipe 185 may be configured to communicate with USC 160 in order to coordinate vertex processing. In the illustrated embodiment, vertex pipe 185 is configured to send processed data to fragment pipe 175 and/or USC 160 for further processing.

Fragment pipe 175, in the illustrated embodiment, may include various fixed-function hardware configured to process pixel data. Fragment pipe 175 may be configured to communicate with USC 160 in order to coordinate fragment processing. Fragment pipe 175 may be configured to perform rasterization on polygons from vertex pipe 185 and/or USC 160 to generate fragment data. Vertex pipe 185 and/or fragment pipe 175 may be coupled to memory interface 180 (coupling not shown) in order to access graphics data.

USC 160, in the illustrated embodiment, is configured to receive vertex data from vertex pipe 185 and fragment data from fragment pipe 175 and/or TPU 165. USC 160 may be configured to perform vertex processing tasks on vertex data which may include various transformations and/or adjustments of vertex data. USC 160, in the illustrated embodiment, is also configured to perform fragment processing tasks on pixel data such as texturing and shading, for example. USC 160 may include multiple execution instances for processing data in parallel. USC 160 may be referred to as "unified" in the illustrated embodiment in the sense that it is configured to process both vertex and fragment data. In other embodiments, programmable shaders may be configured to process only vertex data or only fragment data.

TPU 165, in the illustrated embodiment, is configured to schedule fragment processing tasks from USC 160. In one embodiment, TPU 165 may be configured to pre-fetch texture data and assign initial colors to fragments for further processing by USC 160 (e.g., via memory interface 180). TPU 165 may be configured to provide fragment components in normalized integer formats or floating-point formats, for example. In one embodiment, TPU 165 may be configured to provide fragments in groups of four (a "fragment quad") in a 2×2 format to be processed by a group of four execution instances in USC 160.

PBE 170, in the illustrated embodiment, is configured to store processed tiles of an image and may perform final operations to a rendered image before it is transferred to a frame buffer (e.g., in a system memory via memory interface 180). Memory interface 180 may facilitate communications with one or more of various memory hierarchies in various embodiments.

In various embodiments, a programmable shader such as USC 160 may be coupled in any of various appropriate configurations to other programmable and/or fixed-function elements in a graphics unit. The exemplary embodiment of FIG. 1B shows one possible configuration of a graphics unit 150 for illustrative purposes.

Exemplary GPU that Includes Special-Purpose Interpolate and Sample Pipelines

Figure 2:
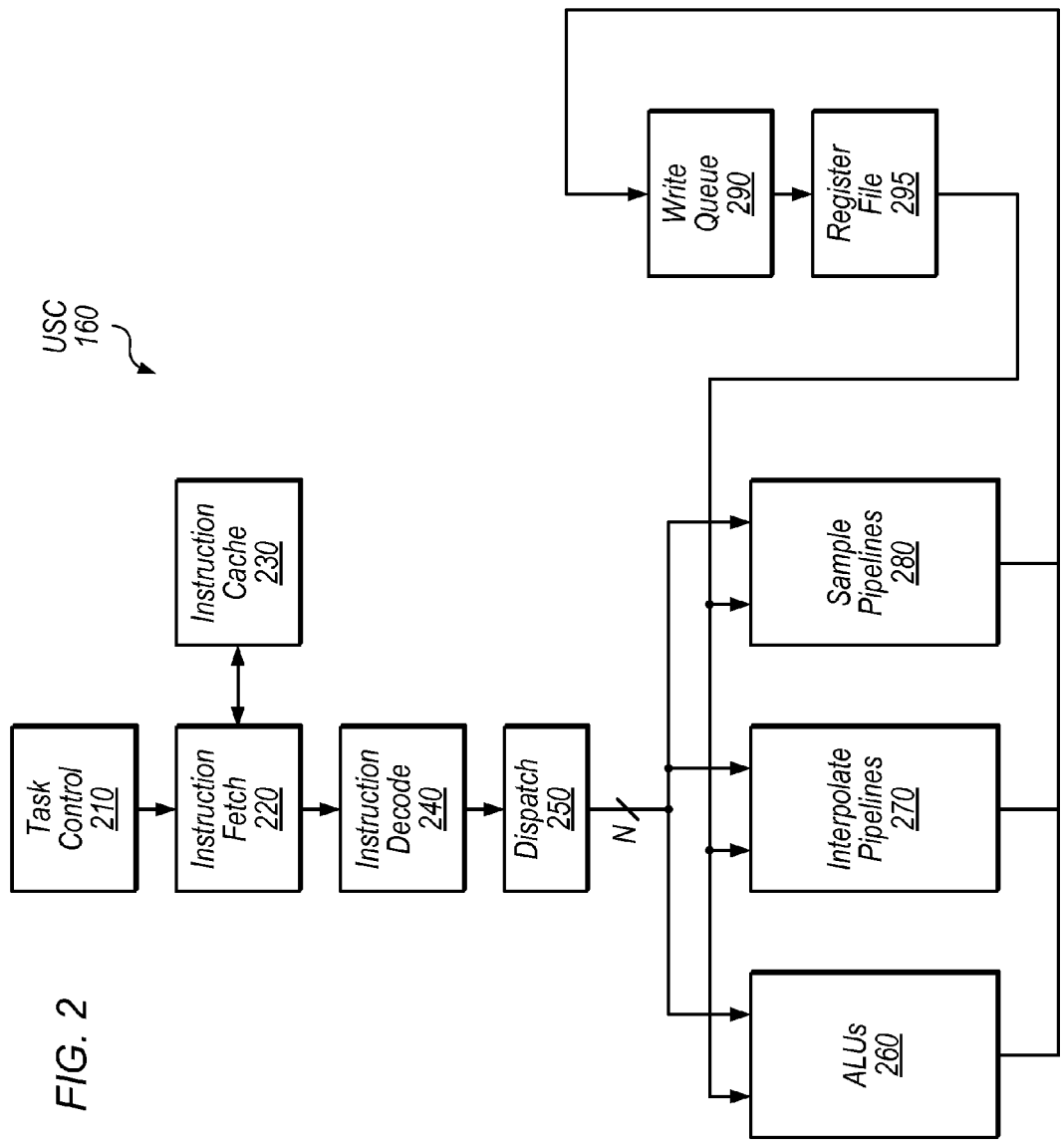
FIG. 2 is a block diagram illustrating one embodiment of a unified shading cluster that includes special purpose interpolate and sample pipelines.

Referring now to FIG. 2, a block diagram illustrating one embodiment of USC 160 is shown. In the illustrated embodiment, USC 160 includes task control circuitry 210, instruction fetch unit 220, instruction cache 230, instruction decode unit 240, dispatch unit 250, arithmetic logic units (ALUs) 260, interpolate pipelines 270, sample pipelines 280, write queue 290, and register file 295. Thus, in the illustrated embodiment, USC 160 includes different pipelines for processing interpolate instructions and sample instructions. USC 160 may include any of various appropriate numbers of ALUs 260, interpolate pipelines 270, and/or sample pipelines 280 for single-instruction-multiple-data (SIMD) execution in various embodiments.

A "sample" instruction" refers to an instruction usable to instruct a GPU to fetch data from a texture. In one embodiment, the actual texture access is performed by TPU 165. In some embodiments, a sample instruction simply issues a command to TPU 165 and the results are written back by TPU 165 at a later time. Sample instructions may include fields for passing references to texture state information and/or sampler state information as well as various other parameters.

An "interpolate instruction" refers an instruction usable to instruct a GPU to interpolate based on a set of coefficients. Typically, three coefficients are used. Interpolate instructions are often used to generate a varying value for a fragment shader (e.g., based on the properties of vertices making up a polygon in which the fragment resides). Interpolate instructions may be used to generate texture coordinates for pixels based on texture coordinates of vertices of a polygon that includes the pixels.

A common instruction sequence uses an interpolate instruction to determine texture coordinates for pixels and a sample instruction to fetch the texture data based on the coordinates. In this situation, the sample instruction is dependent on a result of the interpolate instruction, which is often passed using a shared temporary register. The dependency may conventionally be handled by inserting a read after write (RAW) dependency fence instruction between the interpolate instruction and the sample instruction, as follows:

interpolate
RAW dependency fence
sample

However, the RAW fence may take several cycles to handle, reducing processing performance.

Further, it may be desirable to implement separate interpolate and sample pipelines as shown in FIG. 2. This may allow parallel execution of instructions across multiple tasks and shader quads (2×2 groups of pixels). However, separate pipelines may further complicate resolution of dependencies between sample and interpolate instructions. Further, not all interpolation instructions are followed by a sample instruction. Complex solutions for handling dependencies such as register renaming may consume considerable power and may not be efficient for mobile GPU applications, for example.

SIMD Overview

Graphics processing typically involves performing operations in parallel for groups of graphics elements such as pixels or vertices. SIMD techniques are typically used in which a single instruction is performed in parallel for multiple graphics elements (e.g., a blend operation may be performed for 8 pixels at the same time using 8 shaders, using the same instruction but potentially different input operands for each pixel). Often, the number of graphics elements to be processed is greater than the width of the SIMD implementation. For example, if a set of operations is to be performed for 128 pixels and only 8 pipelines are included in a given SIMD implementation, the 128 pixels may be assigned to 16 tasks or groups that each include 8 pixels.

As used herein, the term "graphics element" is to be interpreted broadly to refer to any set of data that can be processed or combined during formation of a frame of graphics data, including for example: vertices, pixels or fragments, various graphics primitives, etc.

A "task" refers to a set of operations to be performed for 1 to N execution instances or graphics elements, where N is an integer representing the maximum task size for a given embodiment. In some embodiments, each execution instance is performed using different hardware circuitry. USC 160, in some embodiments, is configured to perform single instruction multiple data (SIMD) operations for vertex, pixel, and compute programs provided by a user. In these embodiments, USC 160 is configured to receive tasks that include from 1 to N SIMD instances and execute the same program (or set of instructions) for the 1 to N instances. N, in some embodiments, is the width of the SIMD implementation, e.g., the number of ALUs 260 available for parallel operations. The type of instance may be based on the type of program. For example, a vertex task may run the same program on 1 to N vertices while a pixel task may run the same program on 1 to N pixels. In these embodiments, USC 160 is configured to execute a given task's program correctly, which may include managing dependencies between instructions within a task as well as managing any resources allocated to each task. In these embodiments, USC 160 includes resources for each task such as instruction dependency logic and an instruction address pointer. In one embodiment, USC 160 is configured to manage multiple tasks concurrently and maintain unique resources for each task, while execution pipelines may be shared by various in-flight tasks.

In some embodiments, one or more slots are generated for each task. A single slot may be generated for each task or multiple slots may be generated for each task. In embodiments in which tasks are not split into multiple slots, the term "slot" is synonymous with the term "task." However, in one embodiment, USC 160 is configured to support multi-sample anti-aliasing (MSAA). In this embodiment, in non-MSAA modes a slot is generated for each task and corresponds to the task. In this embodiment, in MSAA mode, USC 160 is configured to generate attributes for multiple pixel fragment samples (e.g., 2, 4, or 8 in some embodiments) and merge the attributes in a weighted fashion to create final pixel attributes. In this embodiment, in MSAA mode, USC 160 is configured to generate multiple slots for a task to parallelize processing of the sub-pixels. In one embodiment, there are no interdependencies between operations for different slots. In embodiments in which multiple slots may be generated for each task, a "slot" refer to either a task or to an independent sub-task generated for a task.

Graphics elements assigned to the same task and/or slot may be referred to as a "group of graphics elements" or as making up a "SIMD group." In various embodiments, dependencies must be handled between operations corresponding to the same SIMD group, while dependencies between different tasks or SIMD groups may be ignored (e.g., because different SIMD groups or tasks involve different graphics elements). In various embodiments, USC 160 is configured to determine whether instructions correspond to the same SIMD group based on whether they are assigned to the same slot, e.g., based on a slot ID. In other embodiments, other techniques may be used to determine whether instructions and/or graphics elements are associated with a given SIMD group.

The concept of "execution" is broad and may refer to 1) processing of an instruction throughout an execution pipeline (e.g., through fetch, decode, execute, and retire stages) and 2) processing of an instruction at an execution unit or execution subsystem of such a pipeline (e.g., an integer execution unit or a load-store unit). The latter meaning may also be referred to as "performing" the instruction. Thus, "performing" an add instruction refers to adding two operands to produce a result, which may, in some embodiments, be accomplished by a circuit at an execute stage of a pipeline (e.g., an execution unit). Conversely, "executing" the add instruction may refer to the entirety of operations that occur throughout the pipeline as a result of the add instruction. Thus, performing a sample instruction may refer to accessing operands of the instruction and sending a command to TPU 165 based on the operands, in some embodiments.

Task control circuitry 210, in the illustrated embodiment, is configured to maintain various resources to facilitate execution of waiting and/or executing tasks and/or slots. In some embodiments, task control circuitry 210 is configured to generate one or more slots for each task. Often, a greater number of tasks may be available than can be executed at once in a given embodiment. For example, 100 tasks may be available for execution, but ALUs 260 may be configured to execute instructions for only three slots at a time. In some embodiments, in this situation, tasks and/or slots are assigned to hardware for execution as slots become available upon completion of other tasks/slots. Various scheduling algorithms may be implemented to select the next task/slot for execution. In some embodiments, ALUs 260, interpolate pipelines 270, and/or sample pipelines 280 are configured to perform operations for multiple tasks/slots at a time, e.g., in an interleaved manner.

Instruction fetch unit 220, in the illustrated embodiment, is configured to fetch graphics instructions from instruction cache 230, which may be coupled to one or more additional caches or memories (not shown). In some embodiments, fetch unit 220 is configured to fetch instructions based on an instruction pointer for a given task, which may be provided by task control circuitry 210. As discussed above, each fetched instruction may be performed in parallel for a group of graphics elements.

Instruction decode unit 240, in the illustrated embodiment, is configured to identify the nature of each instruction, e.g., based on its opcode. Decode unit 240 may be configured to indicate which pipelines should process a given instruction (e.g., add instructions may be performed by ALUs 260 while sample instructions may be performed by sample pipelines 280).

Dispatch unit 250, in the illustrated embodiment, is configured to receive and dispatch instructions for a given SIMD group in program order. In the illustrated embodiment, a given instruction is executed for up to N instances. In this embodiment, when an instruction is dispatched to sample pipeline 280, it is the youngest currently-issued instruction in USC 160 for its SIMD group.

ALUs 260, in the illustrated embodiment, are configured to perform various operations such as adds, multiplies, shifts, etc. using operands from various sources in USC 160. Interpolate pipelines 270 are configured to execute interpolate instructions and sample pipelines 280 are configured to execute sample instructions, in the illustrated embodiment. Exemplary embodiments of interpolate pipelines 270 and sample pipelines 280 are described below with reference to FIG. 3-4.

Register file 295, in the illustrated embodiment is shared between various elements of USC 160. Register file 295, in some embodiments, includes multiple banks that are accessible in parallel. In some embodiments, each entry in register file 295 is configured to store data for multiple instances. Dependencies between instructions may often involve registers in register file 295. Write queue 290, in the illustrated embodiment, is configured to queue data to be written to register file 295. In some embodiments, USC 160 is configured to forward interpolation results waiting in write queue 290 to dependent sample instructions in sample pipelines 280 rather than waiting until the results are available in register file 295.

Exemplary Interpolate and Sample Pipelines and Dependency Handling

Referring now to FIGS. 3 and 4, exemplary embodiments of a sample pipeline 300 and an interpolate pipeline 400 are shown. In the illustrated embodiment, sample pipeline 300 includes instruction queue 310, read sequence stage 320, and track stage 330. In the illustrated embodiment, interpolate pipeline 400 includes instruction queue 410, decode stage 420, execute stage 430, and write-back stage 440. Sample control circuitry 415, in the illustrated embodiment, is configured to communicate with various stages of interpolate pipeline 400. Sample control circuitry 415 is also be configured to communicate with sample pipeline 300, in various embodiments.

Regarding sample pipeline 300, instruction queue 310, in the illustrated embodiment, is configured to store instructions until they are ready to be performed (e.g., until execution hardware is available). Read sequence stage 320, in the illustrated embodiment, is configured to access operands for a sample instruction. In this embodiment, a command is then sent to TPU 165, and is then tracked by track stage 330.

Regarding interpolate pipeline 400, instruction queue 410, in the illustrated embodiment is configured to store received interpolate instructions. Decode stage 420, in the illustrated embodiment, is configured to decode received instructions, e.g., to determine what type of interpolation operation is indicated by a given instruction. Execute stage 430, in the illustrated embodiment is configured to perform the interpolation operation while write-back stage 440 is configured to write results to register file 295 and/or another appropriate location in USC 160.

In one embodiment, each sample instruction is assigned a tag. In one embodiment, USC 160 includes a rolling counter configured to generate tags and large enough to generate enough numbers to cover the maximum number of sample instructions that sample pipeline 300 is configured to process at a time.

In the illustrated embodiment, when a sample instruction arrives at instruction queue 310, sample control circuitry 415 is configured to tag an interpolation instruction (e.g., a youngest valid interpolation instruction) from the same slot residing in interpolate pipeline 400 with the tag of the sample instruction. The interpolation instruction may be tagged while it is present in any stage of interpolate pipeline 400, in some embodiments. If no interpolation instructions from the same slot reside in interpolate pipeline 400 at this point, no instructions are tagged (e.g., because dependencies typically do not exist between instructions from different slots). In various embodiments, USC 160 is configured to maintain information indicating a corresponding slot for each instruction (e.g., a slot ID) to facilitate identification of instructions from the same slot. In the illustrated embodiment, a tag proceeds along with the corresponding interpolation instruction throughout interpolate pipeline 400.

Interpolation instructions in interpolate pipeline 400 may normally be considered valid, but may be marked as invalid based on an exception or an execution condition which is not met for a given instance, for example. In some embodiments, sample control circuitry 415 is configured not to tag invalid instructions in order to avoid stalls for false dependencies.

In the illustrated embodiment, sample instructions wait in instruction queue 310 until they are ready to be actually performed. In this embodiment, when a sample instruction is ready to leave instruction queue 310 to be performed, sample control circuitry 415 is configured to stall execution of the sample instruction until interpolate pipeline 400 does not include any instructions with the tag of the sample instruction. In this embodiment, the interpolate pipeline will not include any instructions with the tag when performance of the tagged interpolation instruction has completed. An interpolation instruction has "completed" when its result(s) are available to other instructions. In the illustrated embodiment, interpolation results are available for a given interpolation instruction after it has left write-back stage 440.

In the illustrated embodiment, the OR gate is configured to indicate whether there is a tag in any of the stages of interpolation pipeline 400 that matches the tag of the sample instruction. This technique may ensure that the sample instruction does not proceed without receiving data from an older interpolation instruction on which it depends. This technique may allow omission or removal of a fence instruction between a sample and an interpolate instruction on which it depends (e.g., by a programmer or compiler), which may improve performance.

Stalling the sample pipeline for any older valid interpolation instructions from the same SIMD group or slot, in some embodiments, may result in stalls when there is no actual dependency. However, a large number of sample instructions may depend on an interpolate instruction such that overall performance is improved in various embodiments even though some stalls may be unnecessary. Further, power consumption and complexity may be reduced in comparison to other techniques for handling dependencies, such as register renaming, for example.

In some embodiments, results from a tagged interpolate instruction may be forwarded directly to a dependent sample instruction from write queue 290 rather than waiting to read the results from register file 295. In some embodiments, USC 160 is configured to check that there is really a dependency before forwarding the result. For example, a sample operation may indicate a location in register file 295 as a location of source data while the tagged interpolate instruction may write a result to the location. In this example, USC 160 may be configured to forward the result from write queue 290 to the sample instruction. In other embodiments, USC 160 is configured to forward results directly from interpolate pipeline 400 to sample pipeline 300 (e.g., rather than waiting for the results to arrive at write queue 290 or register file 295). Result forwarding may reduce bank conflicts in accessing register file 295 and improve performance, in some embodiments.

In one embodiment, a "last-use" compiler directive may indicate that the result of an interpolate instruction will not be used again (e.g., other than as an input to the dependent sample instruction, which is a "last use" of the result). In this embodiment, USC is configured not to write the result of the interpolate instruction to register file 295 at all in response to the compiler indication, e.g., because the result is directly forwarded to the sample pipeline. This may reduce power consumption in writing to register file 295 and reduce bank conflicts in accessing register file 295, in some embodiments.

In some embodiments, interpolate pipelines 270 and/or sample pipelines 280 may be configured to separately process portions of a SIMD group. For example, in some embodiments, interpolate pipelines 270 and sample pipelines 280 have a lower bandwidth than ALUs 260. For example, they may be configured to operate on a smaller number of pixels at a time. In one embodiment, interpolate pipelines 270 and sample pipelines 280 are configured to operate on one 2×2 quad of pixels at a time. In one embodiment, interpolate pipeline 270 is configured to indicate when it has completed performance for a portion of an interpolate operation for a SIMD group. In this embodiment, sample pipeline 280 is configured to begin performance of a stalled sample instruction for the completed portion of the SIMD group before completion of the interpolate operation for the entire SIMD group.

Said another way, a SIMD implementation may be configured to operate on groups of pixels that include at most N pixels while particular special-purpose pipelines may be configured to operate on M pixels at a time, where M and N are integers and M is smaller than N. In these embodiments, graphics unit 150 is configured to begin performance of a stalled sample instruction for M particular pixels in response to an indication that a tagged interpolation instruction has completed for those M particular pixels. This rolling execution may improve performance relative to waiting for the tagged interpolation instruction to complete for all N pixels.

Sample and interpolate instructions are discussed herein for exemplary purposes. However, the disclosed dependency resolution techniques may be used for separate pipelines for any of various different types of instructions. These techniques may be particularly useful for instructions that are commonly used in conjunction and often involve a dependency. Further, various embodiments described herein relate to graphics processing. However, similar techniques may be utilized in non-graphics contexts in other embodiments, e.g., for any of various processors that use SIMD execution and different special-purpose pipelines.

Exemplary GPU with Special-Purpose Processing Pipelines

Figure 5:
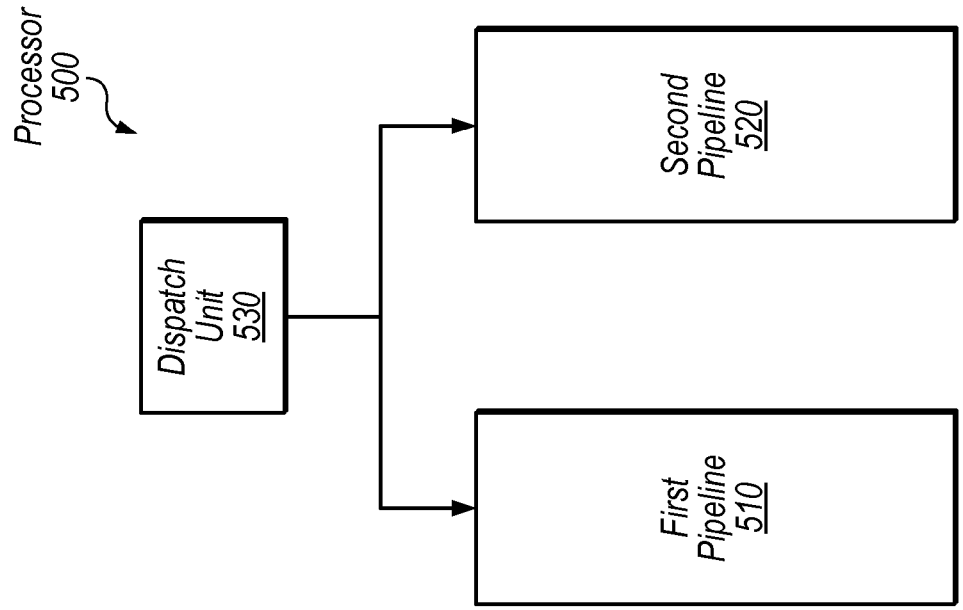
FIG. 5 is a block diagram illustrating a generic processor embodiment that includes different pipelines for different instruction types.

Referring now to FIG. 5, a block diagram illustrating one embodiment of a processor 500 that includes pipelines for different types of instructions is shown. In the illustrated embodiment, processor 500 includes first pipeline 510, second pipeline 520, and dispatch unit 530.

In various embodiments, pipelines 510 and 520 are SIMD pipelines. In some embodiments, first and second pipelines 510 and 520 are special-purpose pipelines configured to execute different types of graphics instructions in parallel for groups of graphics elements. For example, in exemplary embodiments described above, the first pipeline is configured to execute interpolate instructions and the second pipeline is configured to execute sample instructions. In these exemplary embodiments, USC 160 is configured to execute a given interpolate instruction in parallel for a group of pixels using interpolate pipelines 270. In some embodiments, pipelines 510 and 520 are each dedicated to execution of instructions of a single type and are not configured to execute other types of instructions.

Dispatch unit 530, in the illustrated embodiment, is configured to dispatch instructions for execution as appropriate to pipelines 510 and 520. In some embodiments, dispatch unit 530 is configured to dispatch graphics instructions for a given SIMD group in program order.

In one embodiment, first pipeline 510 is configured to execute a first type of instruction and second pipeline 520 is configured to execute a second type of instruction. In this embodiment, dispatch unit 530 is configured to dispatch an instruction of the second type to second pipeline 520. In response to dispatch of the instruction of the second type, processor 500 is configured to mark or indicate a youngest valid instruction of the first type in first pipeline 510 that corresponds to the same group of graphics elements or SIMD group as the instruction of the second type, in this embodiment. Processor 500 is configured, in this embodiment, to stall performance of the instruction of the second type until the first special-purpose instruction has completed all marked or indicated instructions. In some embodiments, the mark or indication may be a tag, as described above. In other embodiments, other techniques may be used.

In some embodiments, processor 500 is configured to forward results of instructions in the first pipeline for use as operands for dependent instructions in the second pipeline. In some embodiments, processor 500 is configured to utilize rolling execution in which execution of a potentially-dependent instruction of the second type is allowed to begin for completed portions of a marked instruction of the first type.

Figure 6:
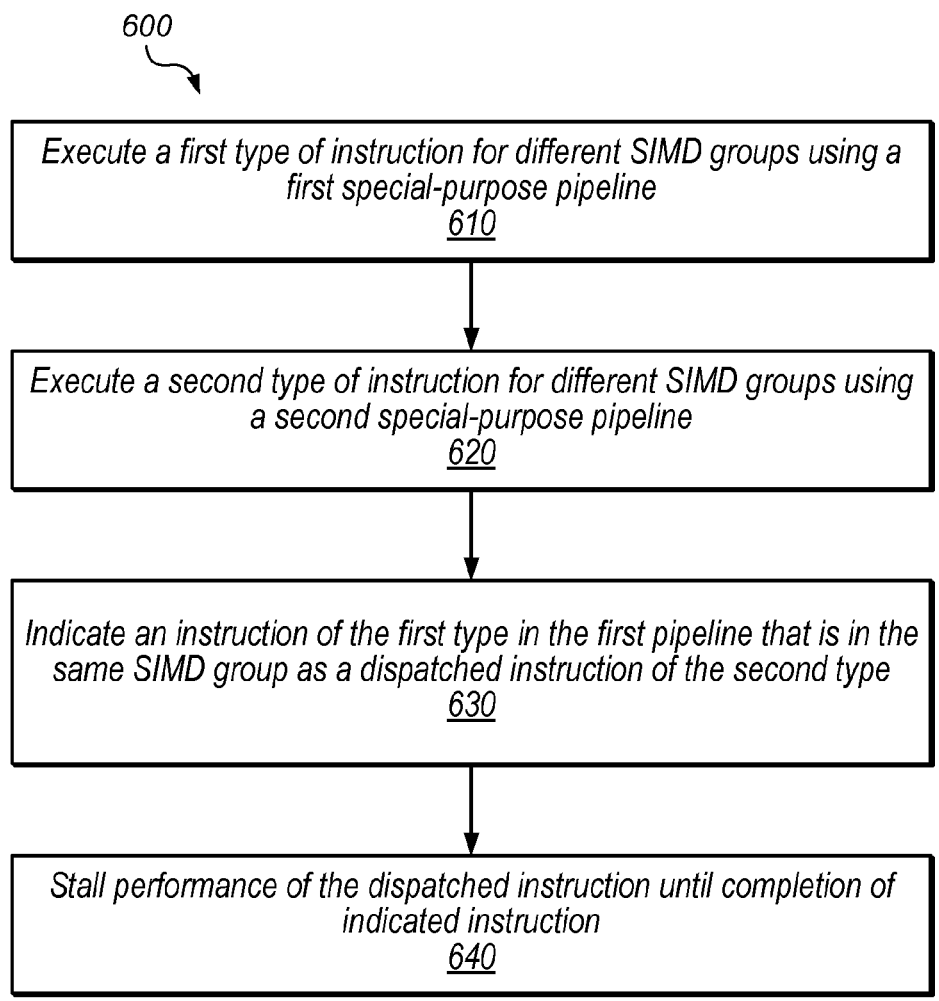
FIG. 6 is a flow diagram illustrating one embodiment of a method for handling dependencies between pipelines for different types of instructions.

Referring now to FIG. 6, a flow diagram illustrating one exemplary embodiment of a method 600 for task scheduling is shown. The method shown in FIG. 6 may be used in conjunction with any of the circuits, devices, elements, or components disclosed herein, among other devices. In various embodiments, some of the method elements shown may be performed concurrently, in a different order than shown, or may be omitted. Additional method elements may also be performed as desired. Flow begins at block 610.

At block 610, a first type of instruction is executed for different SIMD groups using a first special-purpose pipeline. In one embodiment, the first type of instruction is an interpolate instruction. Flow proceeds to block 620.

At block 620, a second type of instruction is executed for different SIMD groups using a second special-purpose pipeline. In one embodiment, the second type of instruction is a sample instruction. The first and second special-purpose pipelines may be dedicated to execution of the first and second types of instruction respectively and not configured to execute other types of instructions, in some embodiments. Flow proceeds to block 630.

At block 630, an instruction of the first type that is in the same SIMD group as a dispatched instruction of the second type is indicated. In one embodiment, the instruction is a youngest valid instruction of the first type that is in the SIMD group. In one embodiment, the youngest valid instruction is indicated using a tag assigned to the dispatched instruction. Flow proceeds to block 640.

At block 640, performance of the dispatched instruction is stalled until completion of the indicated instruction. In some embodiments, USC 160 is configured to determine that the indicated instruction has completed based on determining that no stages in the first pipeline hold an indicated instruction. Flow ends at block 640.

Figure 7:
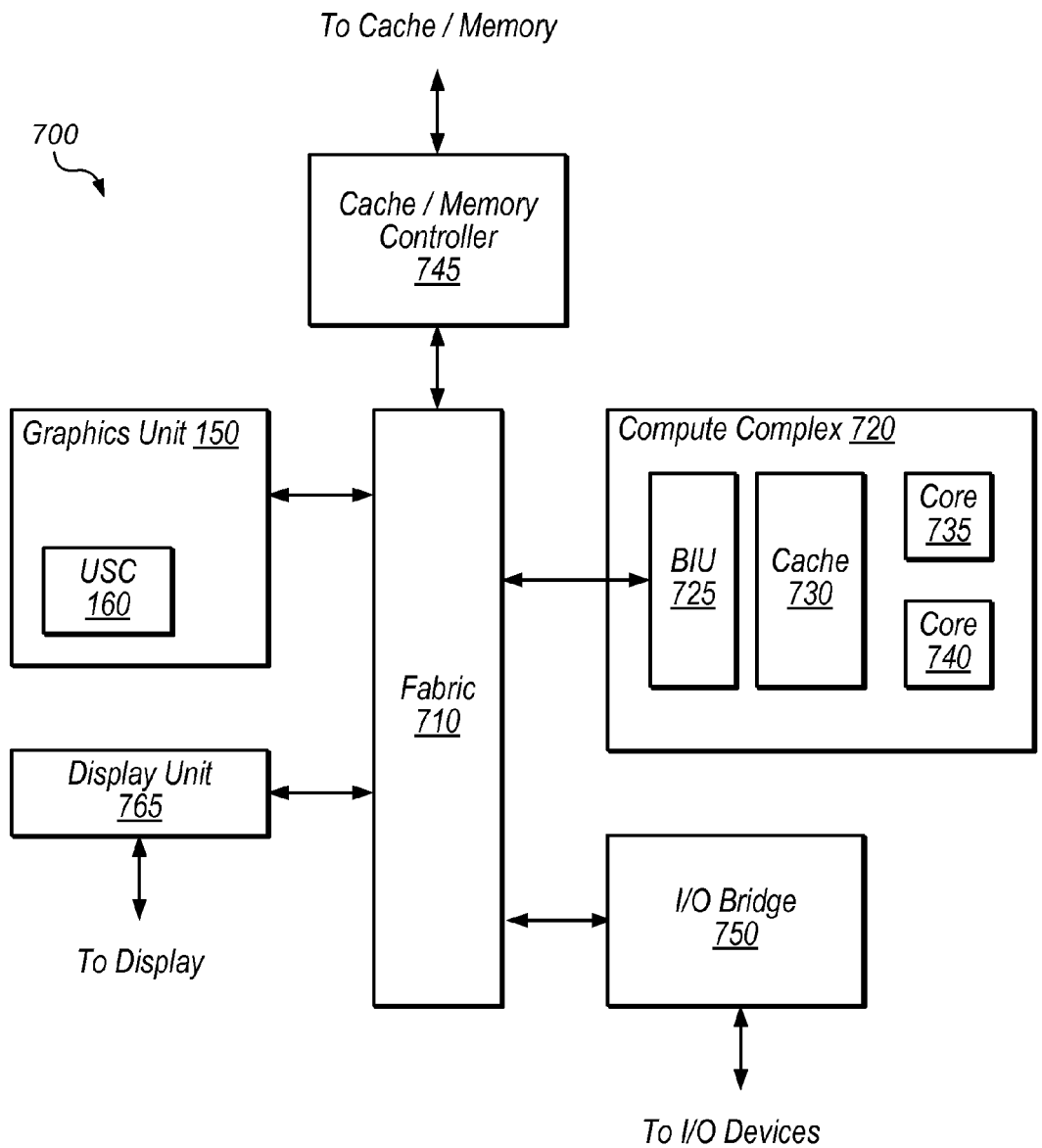
FIG. 7 is a block diagram illustrating one embodiment of a device that includes a graphics unit.

Referring now to FIG. 7, a block diagram illustrating an exemplary embodiment of a device 700 is shown. In some embodiments, elements of device 700 may be included within a system on a chip. In some embodiments, device 700 may be included in a mobile device, which may be battery-powered. Therefore, power consumption by device 700 may be an important design consideration. In the illustrated embodiment, device 700 includes fabric 710, compute complex 720, input/output (I/O) bridge 750, cache/memory controller 745, graphics unit 150, and display unit 765.

Fabric 710 may include various interconnects, buses, MUX's, controllers, etc., and may be configured to facilitate communication between various elements of device 700. In some embodiments, portions of fabric 710 may be configured to implement various different communication protocols. In other embodiments, fabric 710 may implement a single communication protocol and elements coupled to fabric 710 may convert from the single communication protocol to other communication protocols internally.

In the illustrated embodiment, compute complex 720 includes bus interface unit (BIU) 725, cache 730, and cores 735 and 740. In various embodiments, compute complex 720 may include various numbers of cores and/or caches. For example, compute complex 720 may include 1, 2, or 4 processor cores, or any other suitable number. In one embodiment, cache 730 is a set associative L2 cache. In some embodiments, cores 735 and/or 740 may include internal instruction and/or data caches. In some embodiments, a coherency unit (not shown) in fabric 710, cache 730, or elsewhere in device 700 may be configured to maintain coherency between various caches of device 700. BIU 725 may be configured to manage communication between compute complex 720 and other elements of device 700. Processor cores such as cores 735 and 740 may be configured to execute instructions of a particular instruction set architecture (ISA) which may include operating system instructions and user application instructions.

Cache/memory controller 745 may be configured to manage transfer of data between fabric 710 and one or more caches and/or memories. For example, cache/memory controller 745 may be coupled to an L3 cache, which may in turn be coupled to a system memory. In other embodiments, cache/memory controller 745 may be directly coupled to a memory. In some embodiments, cache/memory controller 745 may include one or more internal caches.

As used herein, the term "coupled to" may indicate one or more connections between elements, and a coupling may include intervening elements. For example, in FIG. 7, graphics unit 150 may be described as "coupled to" a memory through fabric 710 and cache/memory controller 745. In contrast, in the illustrated embodiment of FIG. 7, graphics unit 150 is "directly coupled" to fabric 710 because there are no intervening elements.

Graphics unit 150 may be configured as described above with reference to FIGS. 1B-6. Graphics unit 150 may include one or more processors and/or one or more graphics processing units (GPU's). Graphics unit 150 may receive graphics-oriented instructions, such as OPENGL®, Metal, or DIRECT3D® instructions, for example. Graphics unit 150 may execute specialized GPU instructions or perform other operations based on the received graphics-oriented instructions. Graphics unit 150 may generally be configured to process large blocks of data in parallel and may build images in a frame buffer for output to a display. Graphics unit 150 may include transform, lighting, triangle, and/or rendering engines in one or more graphics processing pipelines. Graphics unit 150 may output pixel information for display images. In the illustrated embodiment, graphics unit 150 includes USC 160.

Display unit 765 may be configured to read data from a frame buffer and provide a stream of pixel values for display. Display unit 765 may be configured as a display pipeline in some embodiments. Additionally, display unit 765 may be configured to blend multiple frames to produce an output frame. Further, display unit 765 may include one or more interfaces (e.g., MIPI® or embedded display port (eDP)) for coupling to a user display (e.g., a touchscreen or an external display).

I/O bridge 750 may include various elements configured to implement: universal serial bus (USB) communications, security, audio, and/or low-power always-on functionality, for example. I/O bridge 750 may also include interfaces such as pulse-width modulation (PWM), general-purpose input/output (GPIO), serial peripheral interface (SPI), and/or inter-integrated circuit (I2C), for example. Various types of peripherals and devices may be coupled to device 700 via I/O bridge 750.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, configured to execute first and second different types of graphics instructions, comprising:
   a first pipeline configured to execute the first type of graphics instruction but not the second type of graphics instruction, wherein the first pipeline is configured to execute the first type of graphics instruction in parallel for groups of graphics elements; and
   a second pipeline configured to execute the second type of graphics instruction but not the first type of graphics instruction, wherein the second pipeline is configured to execute the second type of graphics instruction in parallel for groups of graphics elements, wherein:
   the apparatus is configured to, in response to dispatch of an instruction of the second type to the second pipeline, mark a particular instruction of the first type in the first pipeline with information indicative of the dispatched instruction, wherein the particular instruction is a youngest valid instruction in the first pipeline that corresponds to the same group of graphics elements; and
   the apparatus is configured to stall performance of the dispatched instruction until a determination that none of a set of pipeline stages in the first pipeline store instructions that are marked with the information indicative of the dispatched instruction, indicating the first pipeline has completed execution of the marked particular instruction.

2. The apparatus of claim 1,
   wherein the first pipeline is an interpolate pipeline, the second pipeline is a sample pipeline, the dispatched instruction is a sample instruction, and the particular instruction is an interpolate instruction.

3. The apparatus of claim 2, further comprising:
a shared memory; and
a write queue configured to store data to be written to the shared memory, wherein:
the sample instruction indicates a location in the shared memory as a location of source data; and
the apparatus is configured to:
allocate an entry in the write queue for a result of the interpolate instruction; and
forward the source data from the entry in the write queue for use as an operand for the sample instruction.

4. The apparatus of claim 3, wherein the write queue includes circuitry configured to refrain from writing the result of the interpolate instruction to the shared memory based on a compiler directive.

5. The apparatus of claim 2,
wherein each group of graphics elements includes at most N graphics elements;
wherein the sample and interpolate pipelines are configured to operate on M graphics elements at a time, where M is an integer that is smaller than N; and
wherein the apparatus is configured, in response to completion of the interpolation instruction for M particular graphics elements in a group of graphics elements, to begin performance of the sample instruction for the M particular graphics elements before the interpolation instruction has been completed for the entire group of graphics elements.

6. The apparatus of claim 5, wherein M is four and the four particular graphics elements correspond to a 2×2 quad of pixels.

7. The apparatus of claim 2, wherein the interpolate instruction is executable to produce texture coordinates and wherein the sample instruction is executable to access texture data based on the texture coordinates.

8. The apparatus of claim 1, wherein the apparatus is configured to dispatch graphics instructions in program order.

9. A method, comprising:
executing, using a first pipeline of a processor, a first type of instruction for different single-instruction-multiple-data (SIMD) groups, wherein the first pipeline is configured to execute the first type of instruction but not a second type of instruction;
executing, using a second pipeline of the processor, the second type of instruction for different SIMD groups, wherein the second pipeline is configured to execute the second type of instruction but not the first type of instruction;
indicating, by the processor, in response to dispatch of an instruction of the second type to the second pipeline, a youngest valid instruction of the first type that is in the first pipeline and in the same SIMD group as the dispatched instruction; and
stalling, by the processor, performance of the dispatched instruction until determining completion of the indicated instruction based on determining that none of a set of pipeline stages in the first pipeline store the indicated instruction.

10. The method of claim 9, wherein the processor is a graphics processor, the first pipeline is an interpolate pipeline, the second pipeline is a sample pipeline, the dispatched instruction is a sample instruction, and the indicated instruction is an interpolate instruction.

11. The method of claim 10, further comprising:
storing a result of the interpolate instruction using an entry in a write queue for a register file; and
forwarding the result from the write queue for use as an operand of the sample instruction.

12. The method of claim 11, further comprising:
de-allocating the entry in the write queue after forwarding the result and before writing the result to the register file, in response to a last-use indication.

13. The method of claim 10, further comprising:
the interpolate pipeline indicating to the sample pipeline that execution of the interpolation instruction is complete for a portion of the SIMD group; and
the sample pipeline beginning performance of the sample instruction for the completed portion of the SIMD group.

14. The method of claim 9, further comprising:
dispatching SIMD instructions associated with a given SIMD group in program order.

15. The method of claim 9, wherein the indicating includes associating a tag assigned to the instruction of the second type with the youngest valid instruction of the first type.

16. The method of claim 15, further comprising:
assigning the tag to the instruction of the second type at dispatch using a rolling counter.

17. An apparatus, comprising:
an interpolate pipeline configured to execute interpolate instructions for different slots, wherein, for a given slot, the interpolate pipeline is configured to execute interpolation instructions in parallel for graphics elements assigned to the given slot; and
a sample pipeline configured to execute sample instructions for different slots, wherein, for a given slot, the sample pipeline is configured to execute sample instructions in parallel for graphics elements assigned to the given slot;
wherein the apparatus is configured to:
dispatch instructions assigned to a slot in program order;
assign a tag to a sample instruction;
in response to dispatch of the sample instruction, assign the tag to a youngest valid interpolation instruction in the interpolate pipeline from the same slot as the sample instruction; and
stall performance of the sample instruction until completion of the tagged interpolation instruction, wherein the apparatus is configured to detect completion of the tagged interpolation instruction by determining that none of a set of pipeline stages in the interpolate pipeline store instructions that are assigned the tag.

18. The apparatus of claim 17, further comprising:
a register file; and
a write queue configured to store data to be written to the register file;
wherein the apparatus is configured to forward a result of the tagged interpolation instruction from the write queue for use as an operand for the sample instruction.

19. The apparatus of claim 17, wherein the apparatus is configured to execute the interpolate instruction to produce texture coordinates and execute the sample instruction to access a texture based on the texture coordinates.

* * * * *

UNITED STATES PATENT AND TRADEMARK OFFICE
CERTIFICATE OF CORRECTION

PATENT NO.        : 9,519,944 B2
APPLICATION NO.   : 14/475119
DATED             : December 13, 2016
INVENTOR(S)       : Benjiman L. Goodman et al.

Page 1 of 1

It is certified that error appears in the above-identified patent and that said Letters Patent is hereby corrected as shown below:

In Item (72):
Inventors, please add --Micheal A. Geary, Austin, TX (US)--.

Signed and Sealed this
Eighteenth Day of July, 2017

Joseph Matal
*Performing the Functions and Duties of the*
*Under Secretary of Commerce for Intellectual Property and*
*Director of the United States Patent and Trademark Office*